(12) United States Patent
Krishnakumar et al.

(10) Patent No.: US 8,245,234 B2
(45) Date of Patent: Aug. 14, 2012

(54) CREDIT SCHEDULER FOR ORDERING THE EXECUTION OF TASKS

(75) Inventors: Anjur Sundaresan Krishnakumar, Princeton, NJ (US); Parameshwaran Krishnan, Basking Ridge, NJ (US); Min Lee, Atlanta, GA (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 416 days.

(21) Appl. No.: 12/686,719

(22) Filed: Jan. 13, 2010

(65) Prior Publication Data
US 2011/0035749 A1 Feb. 10, 2011

Related U.S. Application Data

(60) Provisional application No. 61/232,542, filed on Aug. 10, 2009, provisional application No. 61/254,019, filed on Oct. 22, 2009.

(51) Int. Cl.
*G06F 9/46* (2006.01)
(52) U.S. Cl. ......................... 718/103; 718/104
(58) Field of Classification Search .................... 718/103
See application file for complete search history.

(56) References Cited

U.S. PATENT DOCUMENTS

| | | |
|---|---|---|
| 5,392,430 A | 2/1995 | Chen et al. |
| 5,701,482 A | 12/1997 | Harrison et al. |
| 6,658,449 B1 | 12/2003 | Brenner et al. |
| 6,687,257 B1 | 2/2004 | Balasubramanian |
| 6,779,182 B1 | 8/2004 | Zolnowsky |
| 6,779,183 B1 | 8/2004 | Chekuei et al. |
| 6,795,927 B1 | 9/2004 | Altmejd et al. |
| 6,985,951 B2 | 1/2006 | Kubala et al. |
| 7,035,984 B2 | 4/2006 | Mastronarde et al. |
| 7,065,764 B1 * | 6/2006 | Prael et al. ..................... 718/102 |
| 7,065,766 B2 | 6/2006 | Brenner et al. |

(Continued)

FOREIGN PATENT DOCUMENTS
EP 1536335 A2 6/2005

OTHER PUBLICATIONS

Tannenbatum et al. "Condor—A Distributed Job Scheduler", ACM, 2001, 45 pages.

(Continued)

*Primary Examiner* — Jennifer To
(74) *Attorney, Agent, or Firm* — Maldjian Law Group LLC; John P. Maldjian, Esq.; Alexander D. Walter, Esq.

(57) ABSTRACT

A method for scheduling the execution of tasks on a processor is disclosed. The purpose of the method is in part to serve the special needs of soft real-time tasks, which are time-sensitive. A parameter $\Delta$ is an estimate of the amount of time required to execute the task. Another parameter $\Gamma$ is the maximum amount of time that the task is to spend in a queue before being executed. In the illustrative embodiment, the preferred wait time $\Gamma_i$ for a newly-arrived task $T_i$ is expected to be met though the insertion of the newly-arrived task $T_i$ into a position k in a queue such that position k respects the task's preferred wait time $\Gamma_i$ in light of the expected execution times of the other tasks already in the queue.

18 Claims, 4 Drawing Sheets

U.S. PATENT DOCUMENTS

| | | | |
|---|---|---|---|
| 7,140,020 B2 | 11/2006 | McCarthy et al. | |
| 7,159,216 B2* | 1/2007 | McDonald | 718/100 |
| 7,437,728 B2 | 10/2008 | Stackhouse et al. | |
| 7,673,113 B2 | 3/2010 | Sugumar et al. | |
| 7,743,140 B2 | 6/2010 | Arndt et al. | |
| 7,793,294 B2 | 9/2010 | Haeri | |
| 7,797,699 B2 | 9/2010 | Kagi et al. | |
| 7,904,673 B2 | 3/2011 | Riska et al. | |
| 7,904,691 B2 | 3/2011 | Branda et al. | |
| 7,937,705 B1* | 5/2011 | Prael et al. | 718/102 |
| 7,979,863 B2 | 7/2011 | Esfahany et al. | |
| 2003/0110203 A1 | 6/2003 | Brenner et al. | |
| 2003/0110204 A1 | 6/2003 | Brenner et al. | |
| 2003/0191794 A1 | 10/2003 | Brenner et al. | |
| 2003/0195920 A1 | 10/2003 | Brenner et al. | |
| 2003/0236815 A1 | 12/2003 | Brenner et al. | |
| 2004/0054999 A1 | 3/2004 | Willen et al. | |
| 2004/0148390 A1 | 7/2004 | Cleary et al. | |
| 2005/0028160 A1 | 2/2005 | Cofer et al. | |
| 2005/0091399 A1 | 4/2005 | Candan et al. | |
| 2005/0262504 A1 | 11/2005 | Esfahany et al. | |
| 2006/0037021 A1* | 2/2006 | Anand et al. | 718/102 |
| 2006/0195845 A1 | 8/2006 | Rhine | |
| 2007/0283176 A1 | 12/2007 | Tobias et al. | |
| 2008/0022284 A1 | 1/2008 | Cherkasova et al. | |
| 2008/0022288 A1 | 1/2008 | Bekooij | |
| 2008/0059968 A1 | 3/2008 | Cascaval et al. | |
| 2008/0134185 A1 | 6/2008 | Federova | |
| 2008/0141048 A1 | 6/2008 | Palmer et al. | |
| 2008/0320122 A1 | 12/2008 | Houlihan et al. | |
| 2009/0031317 A1 | 1/2009 | Gopalan et al. | |
| 2009/0077257 A1 | 3/2009 | Savoor et al. | |
| 2010/0094852 A1* | 4/2010 | Gupta et al. | 707/706 |
| 2010/0095299 A1* | 4/2010 | Gupta et al. | 718/103 |
| 2010/0100877 A1 | 4/2010 | Greene et al. | |
| 2010/0125851 A1 | 5/2010 | Singh et al. | |
| 2010/0131955 A1 | 5/2010 | Brent et al. | |

OTHER PUBLICATIONS

Kim et al. "Guest-Aware Priority-Based Virtual Machine Scheduling for Highly Consolidated Server," 2008, 10 pages.
Santos et al., "Bridging the Gap between Software and Hardware Techniques for I/O Virtualization", "2008 USENIX Annual Technical Conference http.www.usenix.org/events/usenix08/tech/full_papers/santos/santos.pdf", Publisher: USENIX Association, 14 pages.
Apparao et al., "Characterization & Analysis of a Server Consolidation Benchmark", "Virtual Execution Environments Conference 2008 Seattle, Washington", Mar. 5-7, 2008, Publisher: Association for Computing Machinery, 9 pages.
Apparao et al., "Characterization of network processing overheads in Xen", "Second Annual Workshop on Virtualization Technology in Distributed Computing (VTDC 2006)", 2006, Publisher: IEEE, 8 pages.
Willmann et al., "Concurrent Direct Network Access for Virtual Machine Monitors", "HPCA 2007", 12 pages.
Menon et al., "Diagnosing Performance Overheads in the Xen Virtual Machine Environment", "http://www.hpl.hp.com/techreports/2005/HPL-2005-80.pdf", 2005, Publisher: Association for Computing Machinery, 12 pages.
Nishiguchi, Naoki, "Evaluation and consideration of credit scheduler for client virtualization", "http://www.xen.org/files/xensummit_tokyo/15/NaokiNishiguchi-en.pdf Other info at http://www.xen.org/xenxummit/xensummit_fall_2008.html", 2008, Publisher: Fujitsu Laboratories Limited, 55 pages.
Liu et al., "High Performance VMM-Bypass I/O in Virtual Machines", Annual Tech '06: 2006 USENIX Annual Technical Conference http://www.usenix.org/events/usenix06/tech/full_papers/liu/liu.pdf, Publisher: USENIX Assocation, 14 pages.
Raj et al., "High Performance and Scalable I/O Virtualization via Self-Virtualized Devices", "IEEE International Symposium on High Performance Distributed Computing (UPDC) 2007 Monterrey, California", Jun. 25-29, 2007, Publisher: Association for Computing Machinery, 10 pages.

"P.862 Perceptual evaluation of speech quality (PESQ): An objective method for end-to-end speech quality assessment of", 2008, Publisher: International Telecommunication Union (ITU), 1 page.
"Series P: Telephone Transmission Quality, Telephone Installations, Local Line Networks", "ITU-T Recommendation p.862", Feb. 2001, 30 pages.
Menon et al., "Optimizing Network Virtualization in Xen", "http://www.usenix.org/events/usenix06/tech/menon/menon_html/paper.html", 20 pages.
Menon et al., "Optimizing Network Virtualization in Xen", "(Alternative Source) http://infoscience.epfl.ch/getfile.py?docid=8044&name=usenix06&format=pdf&version=1", 14 pages.
Zhang et al., "Optimizing Xen VMM Based on Intel Virtualization Technology", "2008 International Conference on Internet Computing in Science and Engineering", 2008, Publisher IEEE Xplore, 8 pages.
Oi et al., "Performance Analysis of Large Receive Offload in a Xen Virtualized System", "2009 International Conference on Computer Engineering and Technology", 2009, Publisher: IEEE Xplore, 6 pages.
Patnaik et al., "Performance Implications of Hosting Enterprise Telephony Application on Virtualized Multi-Core Platforms", "IPTCOMM 2009 Conference Georgia Tech Atlanta, Georgia", Jul. 7-8, 2009, Publisher: Association for Computing Machinery, Published in: US, 11 pages.
Ongaro et al., "Scheduling I/O in Virtual Machine Monitors", "Virtual Execution Environments 2008 Seattle, Washington", Mar. 5-7, 2008, Publisher: Association for Computing Machinery, 10 pages.
Calandrino et al., "Soft Real-Time Scheduling on Performance Asymmetric Multicore Platforms", 10 pages.
Liao et al., "Software Techniques to Improve Virtualized I/O Performance on Multi-Core Systems", ACM/IEEE Symposium on Architectures for Networking and Communications Systems (ANCS) 2008 San Jose, California, Nov. 6-7, 2008, Publisher: Association for Computing Machinery, 10 pages.
Yoo et al., "A Step to Support Real-time in Virtual Machine", "http://os.korea.ac.kr/publication_papers/inter_confer/shyoo_CCNC_2009.pdf", Publisher: IEEE Xplore, 7 pages.
Thibault, Samuel, "Stub Domains—A Step Towards Dom0 Disaggregation", "http://xen.org/files/xensummitboston08/SamThibault_XenSummit.pdf", Publisher: Xen Summit, 35 pages.
Kim et al., "Task-aware Virtual Machine Scheduling for I/O Performance", "Virtual Execution Environments 2009 Washington, DC", Mar. 11-13, 2009, Publisher: Association for Computing Machinery, 10 pages.
Barham et al., "Xen and the Art of Virtualiztion", "Symposium on Operating System Principles 2003 Bolton Landing, New York http://www.cl.cam.ac.uk/research/srg/netos/papers/2003-xensosp.pdf", Oct. 19-22, Publisher: Association for Computing Machinery, Published in: US, 14 pages.
Govindan et al., "Xen and Co.: Communication-aware CPU Scheduling for Consolidated Xen-baed Hosting Platforms", "Virtual Execution Environments 2007 San Diego, California", Jun. 13-15, 2007, Publisher: Association for Computing Machinery, 11 pages.
Ackaouy, Emmanuel, "[Xen-devel] New CPU Scheduler w/ SMP load balancer", http://lists.xensource.com/archives/html/xen-devel/2006-05/msg01315.html, May 26, 2006, Publisher: xensource.com, 2 pages.
Mathai, Jacob, "Xen WIki—Xen Scheduling", "http://wiki.xensource.com/xenwiki/Scheduling[11/23/2009 11:44:24 AM]", Jun. 9, 2007, 3 pages.
"Xen Summit Asia 2008", "http://www.xen.org/xensummit/xensummit_fall_2008.html[11/23/2009 11:23:18 AM]", Nov. 20-21, 2008, Publisher: xen.org, 2 pages.
Wikipedia online, Multiprocessor Scheduling, http://en.wikipedia.org/wiki/Multiprocessor_scheduling[Apr. 27, 2010], 1 page.
Malkevitch, Joseph, "Bin Packing", "Feature col.—Monthly Essays on Mathematical Topics http://ams.org/samplings/feature-column/fcarc-bins1 Apr. 27, 2010", 2010, Publisher: American Mathematical Society.
Malkevitch, Joseph, "Bin Packing and Machine Scheduling", "Feature col.—Monthly Essays on Mathematical Topics http://www.ams.

org/samplingsfeature-column/fcarc-packings1 Apr. 27, 2010", Publisher: American Mathematical Society.

"Bin packing problem", "Wikipedia http://www.wikipedia.org/wiki/Bin_packing_problem", May 31, 2010, Publisher: Wikimedia Foundation, Inc.

"Credit-Based CPU Scheduler", "Xen Wiki http://wiki.xensource.com/xenwiki/CreditScheduler Apr. 27, 2010", Nov. 15, 2007, Publisher: Citrix Systems, Inc.

Xen.Org, "Credit-Based CPU Scheduler", "Xen Wiki http://www.wiki.xensource.com/xenwiki/CreditScheduler 6/23/2010", Nov. 15, 2007, Publisher: Citrix Systems, Inc.

"How Does Xen Work", "http://www.xen.org/files/Marketing/HowDoesXenWork.pdf Jun. 23, 2010", Dec. 2009.

"How to Enable Xentrace Logging and Format With Xentrace_Format", "Citrix Knowledge Center CTX121583 http://support.citrix.com/article/CTX121583"Publisher: Citrix Systems, Inc.

"Xen Hypervisor—Leading Open Source Hypervisor for Servers", "http://www.xen.org/products/xenhyp.html Apr. 27, 2010", Publisher: Citrix Systems, Inc.

"Multiprocessor Scheduling", "Wikipedia http://en.wikipedia.org/wiki/Multiprocessor_scheduling Apr. 27, 2010", Oct. 29, 2009, Publisher: Wikimedia Foundation, Inc.

Lee et al., "Supporting Soft Real-Time Tasks in the Xen Hypervisor", "VEEE '10: Proceedings of the 6th International Conference on Virtual Execution Environments, 2010", Mar. 17-19, 2010.

Gupta et al, "XenMon: QoS Monitoring and Performance Profiling Tool", "Technical Report HPL-2005-187", Oct. 18, 2005, Publisher: Hewlett-Packard Development Company, LP.

Santos et al, "Bridging the Gap between Software and Hardware Techniques for I/O Virtualization", "2008 USENIX Annual Technical Conference http:www.usenix.org/events/usenix08/tech/full_papers/santos/santos.pdf".. Publisher: USENIX Association.

Apparao et al., "Characterization & Analysis of a Server Consolidation Benchmark", "Virtual Execution Environments Conference 2008 Seattle, Washington", Mar. 5-7, 2008, Publisher: Association for Computing Machinery.

Apparao et al., "Characterization of network processing overheads in Xen", "Second Annual Workshop on Virtualization Technology in Distributed Computing (VTDC 2006)", 2006, Publisher: IEEE.

Willmann et al., "Concurrent Direct Network Access for Virtual Machine Monitors", "HPCA 2007".

Menon et al., "Diagnosing Performance Overheads in the Xen Virtual Machine Environment", "http://www.hpl.hp.com/techreports/2005/HPL-2005-80.pdf", 2005, Publisher: Association for Computing Machinery.

Nishiguchi, Naoki, "Evaluation and consideration of credit scheduler for client virtualization", "http://www.xen.org/files/xensummit_tokyo/15/NaokiNishiguchi-en.pdf Other info at http:www.xen.org/xensummit/xensummit_fall_2008.html", 2008, Publisher: Fujitsu Laboratories Limited.

Liu et al., "High Performance VMM-Bypass I/O in Virtual Machines", "Annual Tech '06: 2006 USENIX Annual Technical Conference http://www.usenix.org/events/usenix06/tech/full_papers/liu/liu.pdf", , Publisher: USENIX Association.

Raj et al., "High Performance and Scalable I/O Virtualization via Self-Virtualized Devices", "IEEE International Symposium on High Performance Distributed Computing (HPDC) 2007 Monterrey, California", Jun. 25-29, 2007, Publisher: Association for Computing Machinery.

"P.862 Perceptual evaluation of speech quality (PESQ): An objective method for end-to-end speech quality assessment of", 2008, Publisher: International Telecommunication Union (ITU).

"Series P: Telephone Transmission Quality, Telephone Installations, Local Line Networks ", "ITU-T Recommendation P.862", Feb. 2001.

Menon et al., "Optimizing Network Virtualization in Xen ", "http://www.usenix.org/events/usenix06/tech/menon/menon_html/paper.html".

Menon et al., "Optimizing Network Virtualization in Xen", "(Alternative Source) http://infoscience.epfl.ch/getfile.py? docid=8044&name=usenix06&format=pdf&version=1".

Zhang et al., "Optimizing Xen VMM Based on Intel Virtualizatio Technology", "2008 International Conference on Internet Computing in Science and Engineering", 2008, Publisher: IEEE Xplore.

Oi et al., "Performance Analysis of Large Receive Offload in a Xen Virtualized System", "2009 International Conference on Computer Engineering and Technology", 2009, Publisher: IEEE Xplore.

Patnaik et al., "Performance Implications of Hosting Enterprise Telephony Application on Virtualized Multi-Core Platforms", "IPTCOMM 2009 Conference Georgia Tech Atlanta, Georgia", Jul. 7-8, 2009, Publisher: Association for Computing Machinery, Published in: US.

Ongaro et al., "Scheduling I/O in Virtual Machine Monitors", "Virtual Execution Environments 2008 Seattle, Washington", Mar. 5-7, 2008, Publisher: Associaton for Computing Machinery.

Calandrino et al., "Soft Real-Time Scheduling on Performance Asymmetric Multicore Platforms".

Liao et al., "Software Techniques to Improve Virtualized I/O Performance on Multi-Core Systems", "ACM/IEEE Symposium on Architectures for Networking and Communications Systems (ANCS) 2008 San Jose, California", Nov. 6-7, 2008, Publisher: Association for Computing Machinery.

Yoo et al., "A Step to Support Real-time in Virtual Machine", "http://os.korea.ac.kr/publication_papers/inter_confer/shyoo_CCNC_2009.pdf", 2009, Publisher: IEEE Xplore.

Thibault, Samuel, "Stub Domains—A Step Towards Dom0 Disaggregation", "http://www.xen.org/files/xensummitboston08/SamThibault_XenSummit.pdf", , Publisher: Xen Summit.

Kim et al., "Task-aware Virtual Machine Scheduling for I/O Performance", "Virtual Execution Environments 2009 Washington, DC", Mar. 11-13, 2009, Publisher: Association for Computing Machinery.

Barham et al., "Xen and the Art of Virtualization", "Symposium on Operating System Principles 2003 Bolton Landing, New York http://www.cl.cam.ac.uk/research/srg/netos/papers/2003-xensosp.pdf", Oct. 19-22, 2003, Publisher: Association for Computing Machinery, Published in: US.

Govindan et al., "Xen and Co.: Communication-aware CPU Scheduling for Consolidated Xen-based Hosting Platforms", "Virtual Execution Environments 2007 San Diego, California", Jun. 13-15, 2007, Publisher: Association for Computing Machinery.

Ackaouy, Emmanuel, "[Xen-devel] New CPU scheduler w/ SMP load balancer", "http://lists.xensource.com/archives/html/xen-devel/2006-05/msg01315.html", May 26, 2006, Publisher: xensource.com.

Mathai, Jacob, "Xen Wiki—Xen Scheduling", "http://wiki.xensource.com/xenwiki/Scheduling[11/23/2009 11:44:24 AM]", Jun. 9, 2007.

"Xen Summit Asia 2008", "http://www.xen.org/xensummit/xensummit_fall_2008.html[11/23/2009 11:23:18 AM]", Nov. 20-21, 2008, Publisher: xen.org.

Santos et al., "Bridging the Gap between Software and Hardware Techniques for I/O Virtualization", "2008 USENIX Annual Technical Conference http:www.usenix.org/events/usenix08/tech/full_papers/santos/santos.pdf", , Publisher: USENIX Association.

Menon et al., "Optimizing Network Virtualization in Xen", "http://www.usenix.org/events/usenix06/tech/menon/menon_html/paper.html".

\* cited by examiner

CREDIT SCHEDULER FOR ORDERING THE EXECUTION OF TASKS

CROSS REFERENCE TO RELATED APPLICATIONS

This application claims the benefit of U.S. provisional application No. 61/232,542, filed Aug. 10, 2009, entitled "Supporting Soft Real-Time Virtual Machines." The concepts, but not necessarily the nomenclature, of this provisional application are hereby incorporated by reference.

Furthermore, this application claims the benefit of U.S. provisional application No. 61/254,019, filed Oct. 22, 2009, entitled "Supporting Soft Real-Time Virtual Machines." The concepts, but not necessarily the nomenclature, of this provisional application are hereby incorporated by reference.

FIELD OF THE INVENTION

The present invention relates to data processing systems in general, and, more particularly, to credit schedulers for ordering the execution of tasks on a processor.

BACKGROUND OF THE INVENTION

When two or more operating systems operate on one piece of hardware, the processes associated with each operating system contend for the hardware that is available. Without something to mediate their access, one operating system's processes could monopolize or over-use the hardware to the detriment of the other operating system's processes. Therefore, a program sits between the operating systems and the hardware to act as a mediator. This program is commonly known as a "hypervisor."

One of the jobs performed by the hypervisor is scheduling the order of execution of tasks associated with each operating system. This is not an easy job. Some tasks are time sensitive (e.g., tasks associated with input or output, speech processing, video processing, transmission or reception of signals, etc.) and some tasks are non-time-sensitive or are less-time-sensitive. Whatever the mix of time-sensitive and non-time-sensitive tasks, the respective operating systems are always presenting to the hypervisor tasks to be performed, and if the hypervisor does not wisely choose the order for executing those tasks, the performance of the entire system can be degraded.

The portion of a hypervisor that determines the order for executing the tasks is called a "scheduler." Schedulers in the prior art, however, do not always choose wisely, and, therefore, the need exists for an improved scheduler.

SUMMARY OF THE INVENTION

The present invention enables the scheduling of the execution of tasks on a processor without some of the costs and disadvantages associated with schedulers in the prior art. The purpose of the present invention is in part to serve the special needs of soft real-time tasks, which are time-sensitive. In the illustrative embodiment, the scheduler analyzes the time-sensitive needs of a task that is to be queued. The scheduler inserts the task into a position in the queue based on the amount of time that the task is to spend in the queue relative to other tasks already queued.

The present invention defines a parameter $\Gamma$, which is the amount of time that a newly-arrived task is to spend in a queue before being executed. The expected execution time of the tasks already queued is one of the parameters relevant to the position that the newly-arrived task will receive in the queue. By using these parameters—and others—some embodiments of the present invention are able to schedule the execution of tasks without some of the costs and disadvantages for doing so in the prior art.

The illustrative embodiment comprises:
receiving at a queue for execution on a processor a task $T_i$, wherein the task $T_i$ has a first estimated execution time $\Delta_i$ and a first preferred wait time $\Gamma_i$, and wherein the queue comprises at least one other task with a position $j$ and an estimated execution time $\Delta_j$; and
inserting the task $T_i$ into the queue at a position $k$, wherein $j \leq k$, such that:

$$\Gamma_i \geq \sum_{j=1}^{k-1} \Delta_j$$

and $$\Gamma_i < \sum_{j=1}^{k} \Delta_j;$$

wherein $j=1$ represents the position at the head of the queue.

DETAILED DESCRIPTION

For the purposes of this specification, the term "processor" is defined as a physical computing resource that is capable of executing a task.

For the purposes of this specification, the term "task" is defined as at least one operation performed by a processor.

Figure 1:
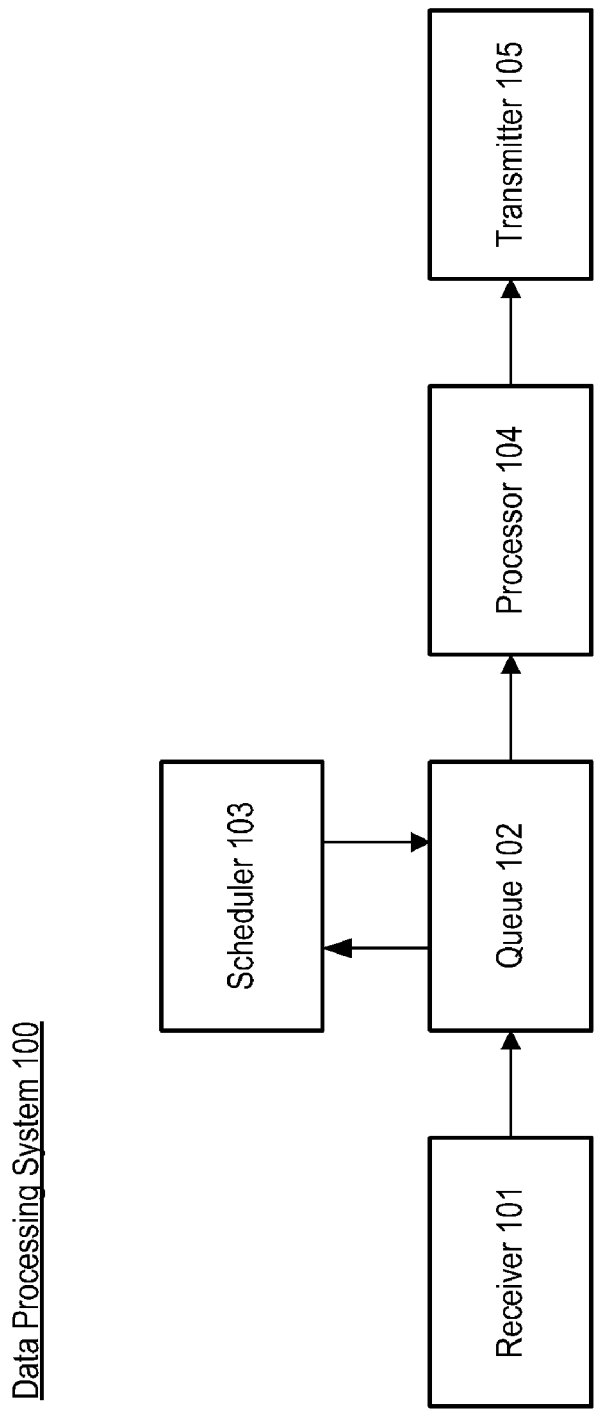
FIG. 1 depicts a block diagram of the salient components of data processing system 100.

FIG. 1 depicts a block diagram of the salient components of data processing system 100. Data processing system 100 is a machine that comprises: receiver 101, queue 102, scheduler 103, processor 104, and transmitter 105.

Although the illustrative embodiment comprises one receiver 101 and one transmitter 105, it will be clear to those skilled in the art, after reading this disclosure, how to make and use alternative embodiments of the present invention that comprise any number of receivers (e.g., two receivers, three receivers, four receivers, etc.) and any number of transmitters (e.g., one transmitter, two transmitters, three transmitters, four transmitters, etc.).

Although the illustrative embodiment comprises one scheduler 103, it will be clear to those skilled in the art, after reading this disclosure, how to make and use alternative embodiments of the present invention that comprise any number of schedulers (e.g., one scheduler, two schedulers, three schedulers, four schedulers, etc.).

Although the illustrative embodiment comprises one queue 102, it will be clear to those skilled in the art, after reading this disclosure, how to make and use alternative embodiments of the present invention that comprise any number of queues (e.g., one queue, two queues, three queues, four queues, etc.).

Although the illustrative embodiment comprises one processor 104, it will be clear to those skilled in the art after reading this disclosure how to make and use alternative embodiments of the present invention that comprise any number of processors (e.g., one processor, two processors, three processors, four processors, etc.).

Receiver 101 is hardware that receives a temporal succession of tasks to be executed by processor 104 and provides those tasks to queue 102. It will be clear to those having ordinary skill in the art, after reading the present disclosure, that in alternative embodiments of the present invention receiver 101 can be software or a combination of software and hardware.

For purposes of the present disclosure, each task is identified by $T_i$ wherein i is an integer that represents the relative order of arrival of the task at receiver 101 with respect to other tasks. For example, task $T_i$ arrived at receiver 101 immediately before task $T_{i+1}$, wherein i is an integer.

In accordance with the illustrative embodiment, each task arrives at receiver 101 with an estimated execution time $\Delta$ parameter. For the purposes of this specification, the phrase "estimated execution time $\Delta_i$" of a task $T_i$ is defined as an estimate of the amount of time required to execute task $T_i$. In accordance with the illustrative embodiment, each task $T_i$ received by receiver 101 is accompanied by an estimated execution time $\Delta_i$ parameter, but it will be clear to those skilled in the art, after reading this disclosure, how to make and use alternative embodiments of the present invention in which some or all of the tasks are not accompanied by an estimated execution time $\Delta_i$ parameter. In those cases, it will be clear to those skilled in the art, after reading this disclosure, how to make and use alternative embodiments of the present invention in which data processing system 100 generates the estimated execution time $\Delta_i$ parameter for one or more tasks.

In the illustrative embodiment of the present invention, the estimated execution time parameter $\Delta$ for a task is the actual execution time of that task during the task's previous execution cycle on processor 104. It will be clear to those having ordinary skill in the art, after reading the present disclosure, how to make and use alternative embodiments of the present invention in which the estimated execution time parameter $\Delta$ is based on an average of actual execution times recorded for previous execution cycles of the task, or in which the estimated execution time parameter $\Delta$ is based on another scheme devised by those implementing the present invention.

In accordance with the illustrative embodiment, each task $T_i$ is either a time-sensitive task or a non-time-sensitive task. In accordance with the illustrative embodiment, each time-sensitive task arrives at receiver 101 with a preferred wait time $\Gamma_i$ parameter. For the purposes of this specification, the phrase "preferred wait time $\Gamma_i$" of task $T_i$ is defined as the maximum amount of time that the task is to spend in a queue before being executed.

It will be clear to those skilled in the art, after reading this disclosure, how to make and use receiver 101.

Queue 102 is hardware that holds each task $T_i$ and its accompanying parameters, while the task awaits execution by processor 104. It will be clear to those having ordinary skill in the art, after reading the present disclosure, that in alternative embodiments of the present invention queue 102 can be software or a combination of software and hardware. In the illustrative embodiment, each task that is already in queue 102, has a "queue index j," wherein j is an integer that represents the relative order in which tasks are lined up in the queue, i.e., j is the position in queue of those tasks that have already been queued. In the illustrative embodiment, processor 104 selects the task at the head of the queue to be executed next. For the purposes of this specification, the head of the queue is defined as having queue index j=1. The queue index j is to be distinguished from the relative order of arrival i.

The position into which a newly-arrived task is inserted in queue 102 is determined by the present invention. For the purposes of this specification, "position k" is defined as a position in queue 102 into which scheduler 103 inserts a newly-arrived task $T_i$ at the time of arrival. The position k is to be distinguished from the relative order of arrival i and from the position index j of tasks that we previously queued. When a newly-arrived task $T_i$ is inserted into queue 102, it may be positioned ahead of tasks that are already queued, thus shifting their respective queue indices j. In general:

$$1 \leq k \leq j+1 \qquad \text{(Eq. 1)}$$

for all integer values of $j \geq 1$, wherein j=1 represents the position at the head of the queue.

For example, Table 1 depicts an illustrative example of queue 102 at time t=0:

TABLE 1

Example of Tasks in Queue 102

| Queue Index J In Queue 102 | Task $T_i$ | Estimated Execution Time $\Delta_i$ (in msec) | Preferred Wait Time $\Gamma_i$ (in msec) |
|---|---|---|---|
| 1 | $T_2$ | 9 | 5 |
| 2 | $T_1$ | 9 | 200 |
| 3 | $T_3$ | 5 | 250 |
| ... | ... | ... | ... |
| 43 | $T_{43}$ | 8 | 225 |

The estimated execution time $\Delta_i$, the preferred wait time $\Gamma_i$, and the queue index j for each task in queue 102 are provided to scheduler 103 for analysis. In the illustrative embodiment shown in Table 1 above, Task $T_2$, having arrived after task $T_1$, was placed in queue 102 ahead of task $T_1$, because the preferred wait time $\Gamma$ of task $T_2$ (5 msec) is more urgent than the expected execution time $\Delta$ of Task $T_1$ (9 msec). This method is explained in more detail in regards to FIG. 3 below.

It will be clear to those skilled in the art, after reading this disclosure, how to make and use queue 102.

Scheduler 103 is hardware and software that is capable of performing the functionality described in this disclosure and in the accompanying figures. It will be clear to those having ordinary skill in the art, after reading the present disclosure, how to make alternative embodiments of the present invention in which scheduler 103 is exclusively hardware, or exclusively software. For example, when scheduler 103 receives the estimated execution time $\Delta_i$, the preferred wait time $\Gamma_i$ for a newly arrived task at queue 102, and the queue index j for each task in queue 102, scheduler 103 analyzes the data and selects a specific position k in queue 102 into which to insert the task relative to the queue index j of those tasks already in queue 102.

In accordance with the illustrative embodiment, scheduler 103 is a "credit" scheduler, but it will be clear to those skilled in the art, after reading this disclosure, how to make and use alternative embodiments of the present invention in which scheduler 103 is not a "credit" scheduler. The XEN® hypervisor is an example of a hypervisor that comprises a credit scheduler, but it will be clear to those having ordinary skill in the art, after reading the present disclosure, that alternative embodiments of the present invention can use a different hypervisor. Furthermore, it will be clear to those skilled in the art that alternative well-known names for a hypervisor include, but are not limited to, a "virtual machine monitor" (VMM).

Processor 104 is hardware that executes tasks from queue 102 in the order determined by scheduler 103. It will be clear to those having ordinary skill in the art, after reading the present disclosure, that in alternative embodiments of the present invention processor 104 can be software or a combination of software and hardware. It will be clear to those skilled in the art how to make and use processor 104. In accordance with the illustrative embodiment of the present invention, processor 104 comprises one core, but it will be clear to those skilled in the art, after reading this disclosure, how to make and use alternative embodiments of the present invention in which processor 104 comprises multiple cores. Furthermore, it will be clear to those skilled in the art that alternative names for a processor include, but are not limited to, a "core" or "CPU."

Transmitter 105 is hardware that transmits the results of each task execution. It will be clear to those skilled in the art how to make and use transmitter 105. It will be clear to those having ordinary skill in the art, after reading the present disclosure, that in alternative embodiments of the present invention transmitter 105 can be software or a combination of software and hardware.

Figure 2:
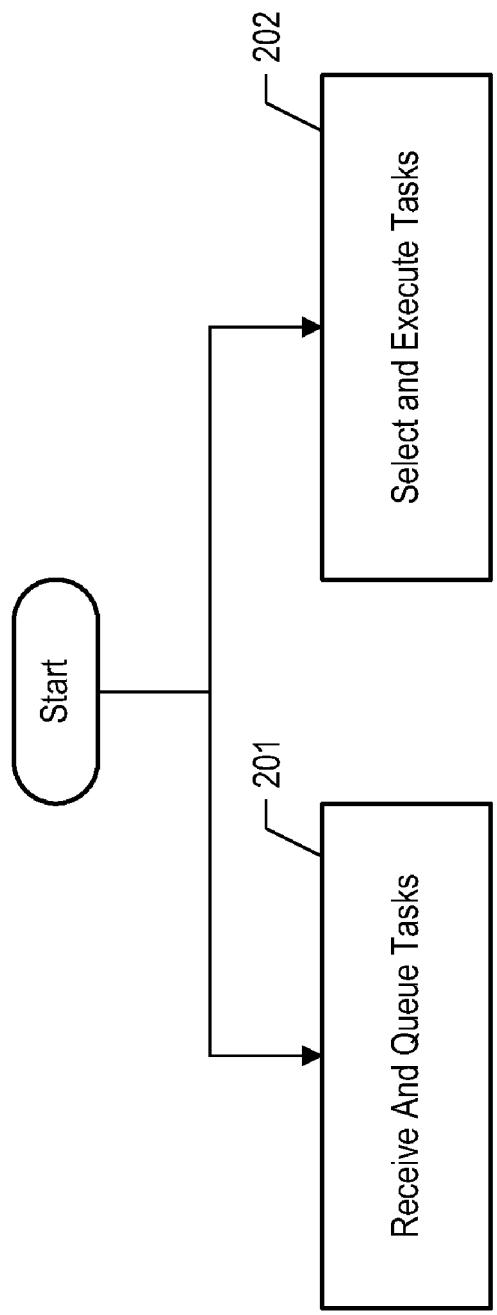
FIG. 2 depicts a flowchart of the salient steps performed by data processing system 100 in accordance with the illustrative embodiment of the present invention.

FIG. 2 depicts a flowchart of the salient steps performed by data processing system 100 in accordance with the illustrative embodiment of the present invention.

At step 201, a temporal succession of tasks is received at receiver 101, analyzed by scheduler 103, and placed into queue 102. In accordance with the illustrative embodiment, each task $T_i$ arrives at receiver 101 with an estimated execution time $\Delta_i$ parameter. For each task $T_i$ that is time sensitive, a preferred wait time $\Gamma_i$ parameter is also received. Step 201 is described in greater detail below and in the accompanying figures.

In some embodiments of the present invention, whether a task is treated as a time-sensitive task depends on whether it arrives from a time-sensitive or a non-time-sensitive "domain." For purposes of this specification, a "domain" is defined as software that is an operating system or an application using the operating system that comprises tasks to be executed by processor 104. Because multiple domains can co-exist in processing system 101 and each domain requires execution of the tasks it comprises on processor 104, whether a domain is time sensitive affects the treatment of its constituent tasks. A voice processing application is an example of a time-sensitive domain. Thus, any task from the voice processing application would be characterized as time sensitive and treated accordingly by scheduler 103. It will be clear to those having ordinary skill in the art, after reading the present disclosure, how to make and use alternative embodiments of the present invention that use domains.

At step 202, processor 104 accesses queue 102 and executes the queued tasks. Step 202 is described in greater detail below and in the accompanying figures.

In accordance with the illustrative embodiment, steps 201 and 202 are continually-running asynchronous processes that operate independently of each other. However, it will be clear to those skilled in the art, after reading this disclosure, how to make and use alternative embodiments of the present invention in which steps 201 and 202 are not independent.

Figure 3:
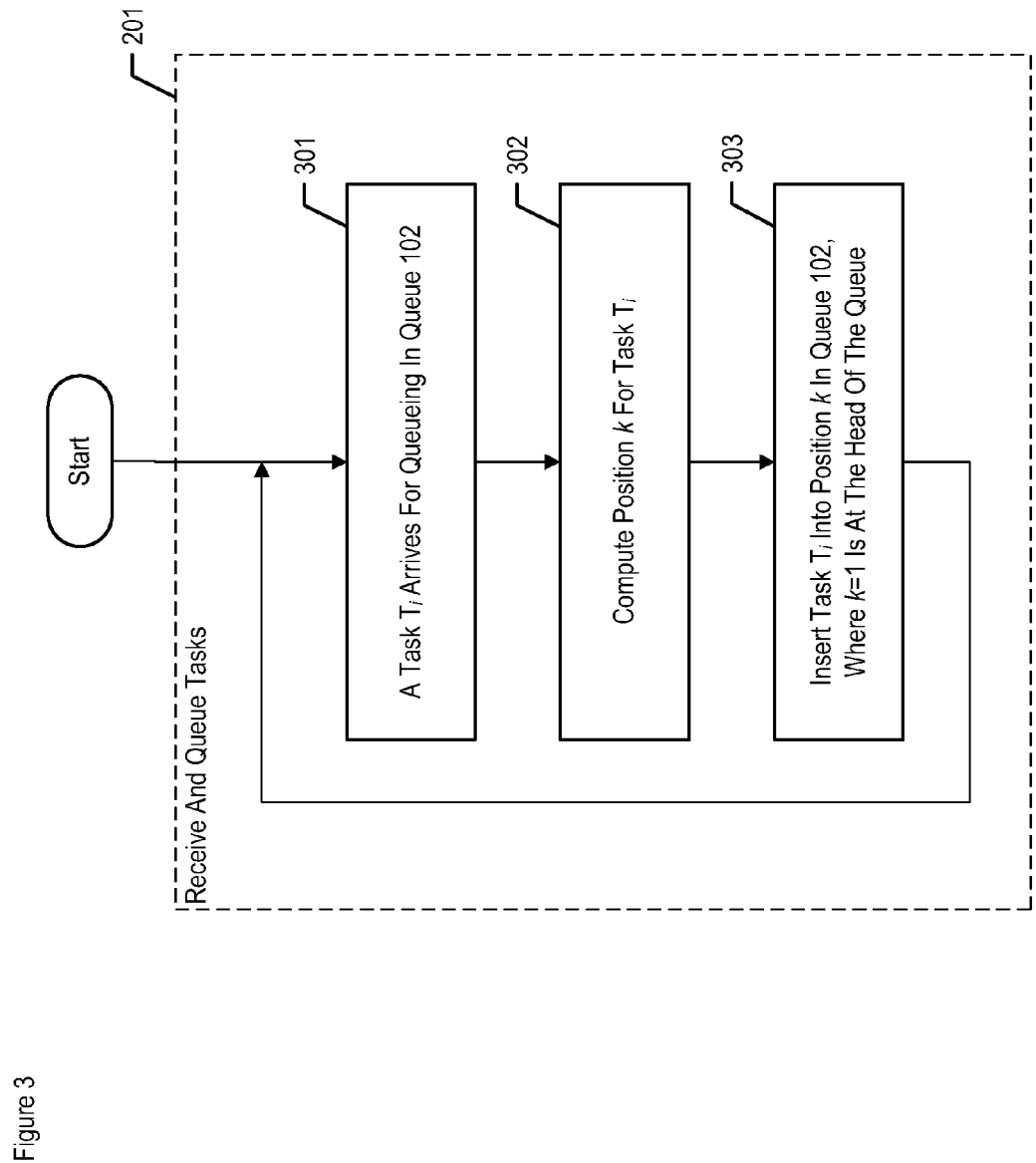
FIG. 3 depicts a flowchart of the salient sub-steps performed by data processing system 100 in performing step 201 in accordance with the illustrative embodiment.

FIG. 3 depicts a flowchart of the salient sub-steps performed by data processing system 100 in performing step 201 in accordance with the illustrative embodiment.

At step 301, a task $T_i$ arrives at receiver 101 for queuing at queue 102 in a manner well-known in the art.

At step 302, scheduler 103 computes position k for task $T_i$ into which position k scheduler 103 will insert task $T_i$ in accordance with the present invention.

In the illustrative embodiment, the preferred wait time $\Gamma_i$ for a newly-arrived task $T_i$ is expected to be met though the insertion or emplacement of the newly-arrived task $T_i$ into a position k in queue 102 such that position k respects the task's preferred wait time $\Gamma_i$ in light of the expected execution times of the other tasks already in queue 102.

A minimum value of k is computed for a newly-arrived task $T_i$ such that:

$$\Gamma_i \geq \sum_{j=1}^{k-1} \Delta_j \qquad (Eq.\ 2)$$

and $$\Gamma_i < \sum_{j=1}^{k} \Delta_j \qquad (Eq.\ 3)$$

where j=1 represents the head of the queue, and where $\Delta_j$ represents the expected execution time of the task queued at position j.

At step 303, task $T_i$ is inserted into queue 102 at position k counting from the head of the queue. The process continues indefinitely as more tasks arrive at receiver 101.

In the illustrative embodiment, a task $T_i$, once placed into a position in queue 102, is not re-positioned, except insofar as a subsequent task $T_n$, where n>i, may be placed in a position in queue 102 ahead of $T_i$. A newly-arrived task may receive a position ahead of other queued tasks depending on the sum of the expected execution times of the already-queued tasks as compared to the preferred wait time for the newly-arrived task.

It should be noted that in some embodiments of the present invention, the expected execution time $\Delta_i$ of newly-arrived task $T_i$ is not material to the calculation of position k for task $T_i$. Furthermore, it will be clear to those having ordinary skill in the art, after reading the present disclosure, that the use of the preferred wait time parameter $\Gamma$ is for those tasks that are time sensitive or otherwise categorized as soft-real-time tasks. Likewise, for a domain categorized as time sensitive or soft-real-time, the tasks it comprises also are treated as time-sensitive with a respective preferred execution time parameter $\Gamma$.

It will be clear to those having ordinary skill in the art, after reading the present disclosure, that in alternative embodiments of the present invention, a task $T_{i+1}$ with a preferred wait time $\Delta_{i+1}$ will be executed on processor 104 ahead of an already queued task $T_i$ when $\Gamma_{i+1} < \Delta_i$, because positioning a newly-arrived task ahead of an already-queued task based on the preferred wait time of the newly-arrived task results, in the illustrative embodiment, in its being executed before an earlier-arrived task already in queue 102.

It will be clear to those having ordinary skill in the art, after reading the present disclosure, that generally, a newly-arrived task goes to the end of queue 102 by default, unless the preferred wait time parameter $\Gamma$ overrules this arrangement under the conditions and circumstances described above.

It will be clear to those having ordinary skill in the art, after reading the present disclosure, how to enable step 201 of the present invention.

Figure 4:
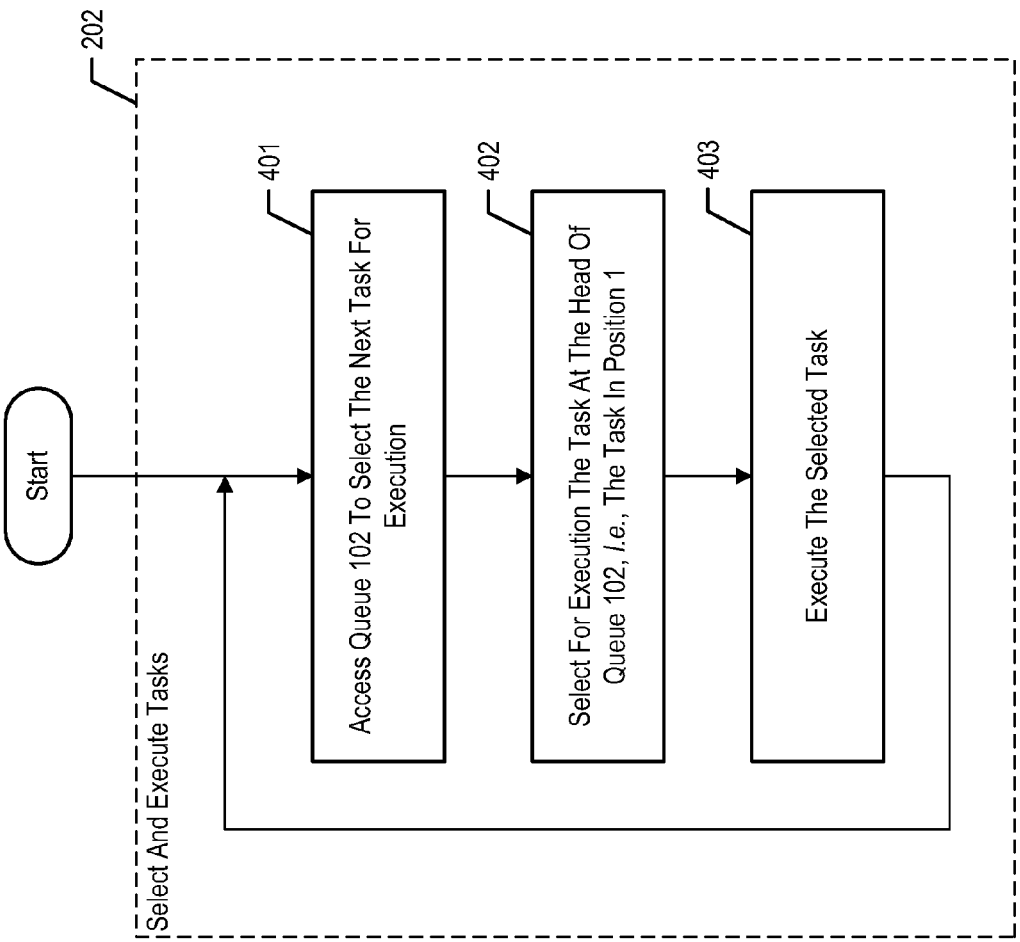
FIG. 4 depicts a flowchart of the salient sub-steps performed by data processing system 100 in performing step 202 in accordance with the illustrative embodiment.

FIG. 4 depicts a flowchart of the salient sub-steps performed by data processing system 100 in performing step 202 in accordance with the illustrative embodiment.

At step 401, processor 104 accesses queue 102 to select the next task for execution in a manner well-known in the art.

At step 402, processor 104 selects the task at the head of the queue for execution, in accordance with the illustrative embodiment. In the illustrative embodiment, position 1 represents the head of the queue, but it will be clear to those having ordinary skill in the art, after reading the present disclosure, how to make and use alternative embodiments of the present invention in which processor 104 selects the next task from any queue such that the selection meets the criteria described above for honoring the preferred wait time $\Gamma_i$ of task $T_i$. It will be clear to those having ordinary skill in the art, after reading the present disclosure, how to enable step 402.

At step 403, processor 104 executes the selected task. How to execute a queued task at a processor is well-known in the art.

It is understood that this disclosure teaches just some examples of how the tasks of processing system 100 are ordered and organized and that many different variations can be devised by those skilled in the art after reading this disclosure. The scope of the present invention is to be determined by the following claims.

What is claimed is:

1. A method comprising:
   receiving at time $t_i$ at a queue for execution on a processor a first task $T_1$, wherein the first task $T_1$ has a first estimated execution time $\Delta_i$, and a first preferred wait time $\Gamma_i$, and wherein the queue comprises at least one other task with a position j and an estimated execution time $\Delta_j$;
   receiving at time $t_2$ at the queue for execution on the processor a second task $T_2$ for execution on the processor, wherein time $t_i$ is before time $t_2$, and wherein the second task $T_2$ has a second estimated execution time $\Delta_m$ and a second preferred wait time $\Gamma_2$;
   inserting the first task $T_1$ into the queue at a position k, wherein j≦k, such that:

$$\Gamma_i \geq \Delta_m + \sum_{j=1}^{k-1} \Delta_j$$

and $$\Gamma_i < \Delta_m + \sum_{j=1}^{k} \Delta_j;$$

and
   executing the second task $T_2$ on the processor before executing the first task $T_1$ when $\Gamma_2 < \Delta_i$,
   wherein j=1 represents the position at the head of the queue.

2. The method of claim 1 wherein the first task $T_i$ is a time-sensitive task.

3. The method of claim 1 wherein the position k is independent of the first estimated execution time $\Delta_i$.

4. The method of claim 1 wherein a time-sensitive domain comprises the first task $T_1$.

5. The method of claim 1 further comprising: executing on the processor the task at the head of the queue with the position j=1.

6. The method of claim 5 wherein the first task $T_1$ is a time-sensitive task.

7. The method of claim 6 wherein the position k is independent of the first estimated execution time $\Delta_i$.

8. The method of claim 5 wherein a time-sensitive domain comprises the first task $T_1$.

9. The method of claim 8 wherein the position k is independent of the first estimated execution time $\Delta_i$.

10. The method of claim 1 wherein the second task $T_2$ is a time-sensitive task.

11. The method of claim 10 wherein the order of execution of the first task $T_1$ and the second task $T_2$ is independent of the second estimated execution time $\Delta_2$.

12. The method of claim 1 wherein a time-sensitive domain comprises the second task $T_2$.

13. The method of claim 12 wherein the order of execution of the first task $T_1$ and the second task $T_2$ is independent of the second estimated execution time $\Delta_2$.

14. A method comprising:
   receiving at a queue for execution on a processor a first task $T_i$, wherein the first task $T_i$ has a first estimated execution time $\Delta_i$ and a first preferred wait time $\Gamma_i$, and wherein the queue comprises at least one other task with a position j and an estimated execution time $\Delta_j$;
   inserting the first task $T_i$ into the queue at a position k, wherein j≦k, such that:

$$\Gamma_i \geq \sum_{j=1}^{k-1} \Delta_j$$

and $$\Gamma_i < \sum_{j=1}^{k} \Delta_j,$$

wherein j=1 represents the position at the head of the queue; and
   executing the first task $T_i$ on the processor before executing a second task $T_n$ when $\Gamma_i < \Delta_n$,
   wherein the first task $T_i$, was received at the queue after the second task $T_n$, and wherein the second task $T_n$ has a second estimated execution time $\Delta_n$.

15. The method of claim 14 wherein the first task $T_i$, is a time-sensitive task.

16. The method of claim 15 wherein the order of execution of the first task $T_i$, and the second task $T_n$ is independent of the first estimated execution time $\Delta_i$.

17. The method of claim 14 wherein a time-sensitive domain comprises the first task $T_i$.

18. The method of claim 17 wherein the order of execution of the first task $T_i$, and the second task $T_n$ is independent of the first estimated execution time $\Delta_i$.

* * * * *